(12) United States Patent
Moy et al.

(10) Patent No.: US 7,310,722 B2
(45) Date of Patent: Dec. 18, 2007

(54) ACROSS-THREAD OUT OF ORDER INSTRUCTION DISPATCH IN A MULTITHREADED GRAPHICS PROCESSOR

(75) Inventors: Simon S. Moy, Los Altos, CA (US); John Erik Lindholm, Saratoga, CA (US)

(73) Assignee: NVIDIA Corporation, Santa Clara, CA (US)

( * ) Notice: Subject to any disclaimer, the term of this patent is extended or adjusted under 35 U.S.C. 154(b) by 527 days.

(21) Appl. No.: 10/742,514

(22) Filed: Dec. 18, 2003

(65) Prior Publication Data

US 2005/0138328 A1   Jun. 23, 2005

(51) Int. Cl.
*G06F 9/38* (2006.01)

(52) U.S. Cl. ..................... 712/207; 712/214
(58) Field of Classification Search ........... 712/207, 712/214
See application file for complete search history.

(56) References Cited

U.S. PATENT DOCUMENTS

| | | | |
|---|---|---|---|
| 3,771,138 A | 11/1973 | Celtruda et al. | |
| 5,357,617 A | 10/1994 | Davis et al. | |
| 5,721,855 A | 2/1998 | Hinton et al. | |
| 6,073,159 A * | 6/2000 | Emer et al. | 718/103 |
| 6,092,181 A | 7/2000 | Nguyen et al. | |
| 6,493,741 B1 * | 12/2002 | Emer et al. | 718/107 |
| 6,574,725 B1 | 6/2003 | Kranich et al. | |

FOREIGN PATENT DOCUMENTS

| | | |
|---|---|---|
| WO | WO 01/77821 A | 10/2001 |
| WO | WO 0177821 A1 | 10/2001 |

OTHER PUBLICATIONS

Eggers et al. "Simultaneous multithreading: A platform for next-generation processors" IEEE Micro, Sep./Oct. 1997(vol. 17, No. 5) pp. 12-19.

Tullsen, Dean et al. Institute of Electrical and Electronics Engineers Association for Computing Machinery: "Exploiting Choice: Instruction Fetch and Issue on an Implementable Simultaneous Multithreading Processor" Proceedings of the 23rd Annual Symposium on Computer Architecture. May 22-24, 1996 Proceedings of the Annual Symposium on Computer Architecture, New York, vol. SYMP. 23, May 22, 1996 pp. 191-202.

Marr et al. *Hyper-Threading Technology Architecture and Microarchitecture* Intel Technology Journal Q1, 2002.

* cited by examiner

*Primary Examiner*—William M. Treat
(74) *Attorney, Agent, or Firm*—Townsend and Townsend and Crew LLP

(57) ABSTRACT

Instruction dispatch in a multithreaded microprocessor such as a graphics processor is not constrained by an order among the threads. Instructions are fetched into an instruction buffer that is configured to store an instruction from each of the threads. A dispatch circuit determines which instructions in the buffer are ready to execute and may issue any ready instruction for execution. An instruction from one thread may be issued prior to an instruction from another thread regardless of which instruction was fetched into the buffer first. Once an instruction from a particular thread has issued, the fetch circuit fills the available buffer location with the following instruction from that thread.

23 Claims, 4 Drawing Sheets

ACROSS-THREAD OUT OF ORDER INSTRUCTION DISPATCH IN A MULTITHREADED GRAPHICS PROCESSOR

BACKGROUND OF THE INVENTION

The present invention relates in general to multithreaded microprocessors, and in particular to dispatching instructions for execution in a multithreaded microprocessor without regard to order among threads.

To meet the needs of video gamers, simulation creators, and other program designers, sophisticated graphics co-processors have been developed for a variety of computer systems. These processors, which generally operate under the control of a general-purpose central processing unit or other master processor, are typically optimized to perform transformations of scene data into pixels of an image that can be displayed on a standard raster-based display device. In a common configuration, the graphics processor is provided with "geometry data," which usually includes a set of primitives (e.g., lines, triangles, or other polygons) representing objects in a scene to be rendered, along with additional data such as textures, lighting models, and the like. The graphics processor performs modeling, viewpoint, perspective, lighting, and similar transformations on the geometry data (this stage is often referred to as "vertex" processing). After these transformations, "pixel" processing begins. During pixel processing, the geometry data is converted to raster data, which generally includes color values and other information for each sample location in an array corresponding to the viewable area; further transformations may be applied to the raster data, including texture blending and downfiltering (reducing the number of sample locations to correspond to the number of pixels in the display device). The end result is a set of color values that can be provided to the display device.

To provide smooth animations and a real-time response, graphics processors are generally required to complete these operations for a new frame of pixel data at a minimum rate of about 30 Hz. As images become more realistic—with more primitives, more detailed textures, and so on—the performance demands on graphics processors increase.

To help meet these demands, some existing graphics processors implement a multithreaded architecture that exploits parallelism. As an example, during vertex processing, the same operations are usually performed for each vertex; similarly, during pixel processing, the same operations are usually performed for each sample location or pixel location. Operations on the various vertices (or pixels) tend to be independent of operations on other vertices (pixels); thus, each vertex (pixel) can be processed as a separate thread executing a common program. The common program provides a sequence of instructions to execution units in an execution core of the graphics processor; at a given time, different threads may be at different points in the program sequence. Since the execution time (referred to herein as latency) of an instruction may be longer than one clock cycle, the execution units are generally implemented in a pipelined fashion so that a second instruction can be issued before all preceding instructions have finished, as long as the second instruction does not require data resulting from the execution of an instruction that has not finished.

In such processors, the execution core is generally designed to fetch instructions to be executed for the different active threads in a round-robin fashion (i.e., one instruction from the first thread, then one from the second, and so on) and present each fetched instruction sequentially to an issue control circuit. The issue control circuit holds the fetched instruction until its source data is available and the execution units are ready, then issues it to the execution units. Since the threads are independent, round-robin issue reduces the likelihood that an instruction will depend on a result of a still-executing instruction. Thus, latency of an instruction in one thread can be hidden by fetching and issuing an instruction from another thread. For instance, a typical instruction might have a latency of 20 clock cycles, which could be hidden if the core supports 20 threads.

However, round-robin issue does not always hide the latency. For example, pixel processing programs often include instructions to fetch texture data from system memory. Such an instruction may have a very long latency (e.g., over 100 clock cycles). After a texture fetch instruction is issued for a first thread, the issue control circuit may continue to issue instructions (including subsequent instructions from the first thread that do not depend on the texture fetch instruction) until it comes to an instruction from the first thread that requires the texture data. This instruction cannot be issued until the texture fetch instruction completes. Accordingly, the issue control circuit stops issuing instructions and waits for the texture fetch instruction to be completed before beginning to issue instructions again. Thus, "bubbles" can arise in the execution pipeline, leading to idle time for the execution units and inefficiency in the processor.

One way to reduce this inefficiency is by increasing the number of threads that can be executed concurrently by the core. This, however, is an expensive solution because each thread requires additional circuitry. For example, to accommodate the frequent thread switching that occurs in this parallel design, each thread is generally provided with its own dedicated set of data registers. Increasing the number of threads increases the number of registers required, which can add significantly to the cost of the processor chip, the complexity of the design, and the overall chip area. Other circuitry for supporting multiple threads, e.g., program counter control logic that maintains a program counter for each thread, also becomes more complex and consumes more area as the number of threads increases.

It would therefore be desirable to provide an execution core architecture that efficiently and effectively reduces the occurrence of bubbles in the execution pipeline without requiring substantial increases in chip area.

BRIEF SUMMARY OF THE INVENTION

Embodiments of the present invention provide systems and methods for dispatching instructions in a multithreaded microprocessor (such as a graphics processor) in a manner that is not constrained by an order among the threads. Instructions are fetched into an instruction buffer that is configured to store an instruction from each of the threads. A dispatch circuit determines which instructions in the instruction buffer are ready to execute and may issue any instruction that is ready; an instruction from any one thread may be issued prior to an instruction from another thread, regardless of which instruction was fetched into the buffer first. Once an instruction from a particular thread has issued, the fetch circuit may fill the available buffer location with the following instruction from that thread.

According to an aspect of the present invention, a microprocessor is provided that is configured for parallel processing of a number of threads, where each thread includes a sequence of instructions. The microprocessor includes an execution module, an instruction buffer, a fetch circuit, and a dispatch circuit. The execution module is configured to execute instructions for all of the threads. The instruction buffer includes a number of storage locations, each storage location being associated with a respective one of the threads The fetch circuit is configured to select one of the threads based at least in part on whether the associated storage location in the instruction buffer is available and to fetch a next instruction in the sequence for the selected one of the threads into the instruction buffer. The dispatch circuit is configured to determine which of the stored instructions in the instruction buffer is ready to execute and to select one of the ready instructions to be issued to the execution unit. The fetch circuit may fetch instructions into the instruction buffer in a first order and the dispatch circuit may select ready instructions in a second order different from the first order.

In some embodiments, the microprocessor also includes an instruction cache configured to store instructions, and the fetch circuit may be further configured to fetch the next instruction by transmitting a request including a program counter value to the instruction cache. The fetch circuit may include program counter logic, a selection logic circuit, and an arbitration circuit. The program counter logic is configured to generate a candidate program counter value for each of the threads. The selection logic circuit is configured to select one of the threads based at least in part on determining which one of the storage locations in the instruction buffer is available; the selection logic circuit is further configured to provide a corresponding selection signal. The arbitration circuit is configured to receive the selection signal and to transmit the candidate program counter value corresponding to the selected thread to the instruction cache. In further embodiments, the threads may include a first group of threads having a first thread type and a second group of threads having a second thread type. The selection logic circuit may be further configured to select one of the threads based at least in part on respective thread types of each of the threads.

In other embodiments, the microprocessor may also include a register file configured to store data for each of the threads, including result data generated by the execution module. The dispatch circuit may include a scoreboard circuit, a scheduler circuit, and an issuer circuit. The scoreboard circuit is coupled to the instruction buffer and the register file and configured to generate a ready signal for each instruction in the instruction buffer, wherein the ready signal for each instruction is asserted or not asserted based at least in part on whether a source operand for the instruction is present in the register file. The scheduler circuit, which is coupled to the scoreboard and to the instruction buffer, is configured to select one of the instructions in the instruction buffer for which the ready signal is asserted as a next instruction to issue and to transmit a corresponding grant signal to the instruction buffer. The issuer circuit is coupled to the instruction buffer, and the instruction buffer is further configured to transmit the instruction selected by the scheduler circuit to the issuer circuit in response to the grant signal. The issuer circuit is configured to collect the source operand for the selected instruction from the register file and to forward the selected instruction and the source operand to the execution module. In further embodiments, the scheduler circuit is further configured to select the next instruction to issue based at least in part on a length of time that each instruction has been stored in the instruction buffer.

According to another aspect of the present invention, a method is provided for processing instructions in a microprocessor configured for concurrent execution of multiple threads. A first instruction from a first one of the threads is fetched into an instruction buffer configured to store an instruction from each of the threads. Subsequently, a second instruction from a second one of the plurality of threads is fetched into the instruction buffer. It is determined whether one or more of the first instruction and the second instruction is ready to execute, and a ready one of the first instruction and the second instruction is issued for execution. The second instruction is selected prior to selecting the first instruction in the event that the second instruction is ready to execute and the first instruction is not ready to execute.

The following detailed description together with the accompanying drawings will provide a better understanding of the nature and advantages of the present invention.

DETAILED DESCRIPTION OF THE INVENTION

Embodiments of the present invention provide systems and methods for enabling instruction dispatch in a multi-threaded microprocessor (e.g., a graphics processor) that is not dependent on a thread order. Instructions are fetched into an instruction buffer that is configured to store an instruction from each of the threads. A dispatch circuit determines which instructions in the instruction buffer are ready to execute and may issue any instruction that is ready; an instruction from any one thread may be issued prior to an instruction from another thread, regardless of which instruction was fetched into the buffer first. Once an instruction from a particular thread has issued, the fetch circuit fills the available buffer location with the following instruction from that thread. Consequently, idle time in the execution pipeline due to blocked threads can be reduced. For instance, if one of the threads is blocked (because its next instruction is dependent on an instruction that has not completed), the processor can continue to issue any number of instructions from any of the other threads during that time.

Figure 1:
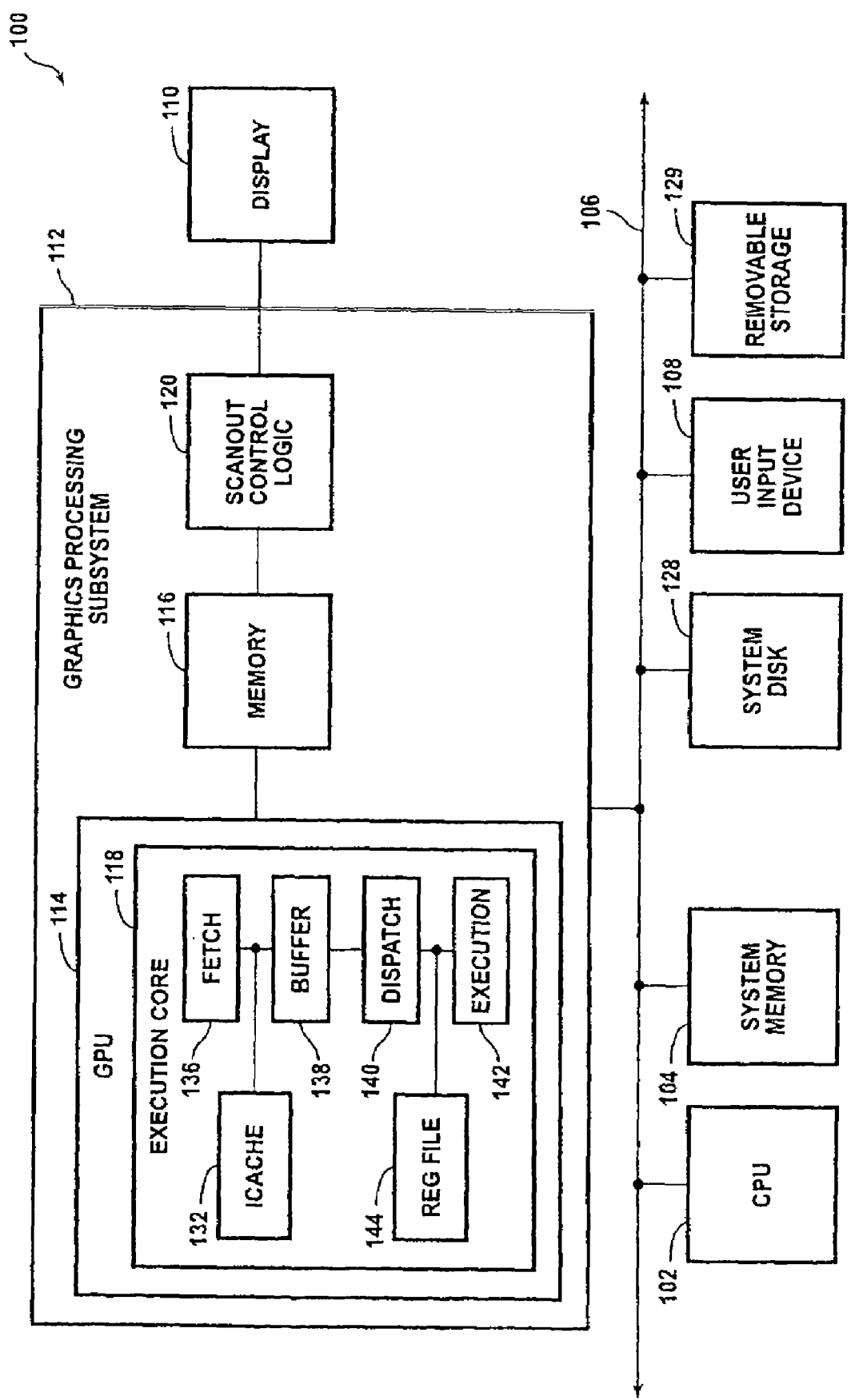
FIG. 1 is a simplified high-level block diagram of a computer system according to an embodiment of the present invention.

FIG. 1 is a block diagram of a computer system 100 according to an embodiment of the present invention. Computer system 100 includes a central processing unit (CPU) 102 and a system memory 104 communicating via a bus 106. User input is received from one or more user input devices 108 (e.g., keyboard, mouse) coupled to bus 106. Visual output is provided on a pixel based display device 110 (e.g., a conventional CRT or LCD based monitor) operating under control of a graphics processing subsystem 112 coupled to system bus 106. A system disk 128 and other components, such as one or more removable storage devices 129 (e.g., floppy disk drive, compact disk (CD) drive, and/or DVD drive), may also be coupled to system bus 106. System bus 106 may be implemented using one or more of various bus protocols including PCI (Peripheral Component Interconnect), AGP (Accelerated Graphics Port) and/or PCI-Express (PCI-E); appropriate "bridge" chips such as a conventional north bridge and south bridge (not shown) may be provided to interconnect various components and/or buses.

Graphics processing subsystem 112 includes a graphics processing unit (GPU) 114, a graphics memory 116, and scanout control logic 120, which may be implemented, e.g., using one or more integrated circuit devices such as programmable processors and/or application specific integrated circuits (ASICs). GPU 114 may be configured to perform various tasks, including generating pixel data from graphics data supplied via system bus 106, interacting with graphics memory 116 to store and update pixel data, and the like. Relevant features of GPU 114 are described further below.

Scanout control logic 120 reads pixel data from graphics memory 116 (or, in some embodiments, system memory 104) and transfers the data to display device 110 to be displayed. In one embodiment, scanout occurs at a constant refresh rate (e.g., 80 Hz); the refresh rate can be a user selectable parameter. Scanout control logic 120 may also perform other operations such as adjusting color values for particular display hardware; generating composite screen images by combining the pixel data with data for a video or cursor overlay image or the like obtained, e.g., from graphics memory 116, system memory 104, or another data source (not shown); converting digital pixel data to analog signals for the display device; and so on. It will be appreciated that the particular configuration of graphics processing subsystem 112 is not critical to the present invention.

During operation of system 100, CPU 102 executes various programs, such as operating system (OS) programs, and application programs, as well as a driver program for graphics processing subsystem 112. These programs may be of generally conventional design. For instance, the graphics driver program may implement one or more standard application program interfaces (APIs), such as Open GL, Microsoft DirectX, or D3D for communication with graphics processing subsystem 112; any number or combination of APIs may be supported, and in some embodiments separate driver programs may be provided to implement different APIs. By invoking appropriate API function calls, operating system programs and/or application programs instruct the graphics driver program to transfer graphics data or pixel data to graphics processing subsystem 112 via system bus 106, to invoke various rendering functions of GPU 114, and so on. The specific commands and/or data transmitted to graphics processing subsystem 112 by the graphics driver program in response to an API function call may vary depending on the implementation of GPU 114, and the graphics driver program may also transmit commands and/or data implementing additional functionality (e.g., special visual effects) not controlled by operating system or application programs.

In accordance with an embodiment of the present invention, GPU 114 is configured for concurrent processing of a large number of threads, where each thread corresponds to an independent sequence of processing instructions. GPU 114 can execute a next instruction from any one of the threads at any given time.

For example, each vertex of an image may be processed using a separate thread, with concurrent threads executing the same processing program(s) on different data for the image; at a given time, different ones of the threads may be at different points in the program. In some embodiments, there may be multiple thread types, where all threads of one type perform the same processing program and threads of different types perform different processing programs. For example, there may be a "vertex" thread type whose processing program includes geometry and lighting transformations and a "pixel" thread type whose processing program includes texture blending and downfiltering of oversampled data.

In the embodiment of FIG. 1, GPU 114 includes a number of independent execution cores 118, each of which is configured to process instructions received from a number of threads (not shown). The maximum number of concurrent threads supported by GPU 114 is the number of cores 118 multiplied by the number of threads per core; for instance, in one embodiment, there are eight cores 118, each of which can support up to 16 threads, for a total of 128 concurrently executing threads. The number of cores and number of threads may be varied; for example, there may be eight cores, each supporting 24 threads (192 total threads); ten cores, each supporting 24 threads (240 total threads) and so on.

Each execution core 118 includes an instruction cache 132, an instruction fetch circuit 136, a buffer 138, a dispatch circuit 140, an execution module 142 that includes a set of execution units (not shown), and a register file 144. Instruction cache (Icache) 132, which may be of generally conventional design, stores executable instructions that are obtained, e.g., from graphics memory 116. Each instruction in Icache 132 may be identified using a program counter (PC) value. Fetch circuit 136 fetches instructions from Icache 132 for all threads processed by execution core 118, maintaining a sequential program order within each thread, and supplies the fetched instructions to a buffer 138. On each clock cycle, dispatch circuit 140 selects an instruction from buffer 138 to be issued to execution module 142.

In one embodiment, buffer 138 is configured to store at least one instruction per thread and to maintain the sequential program order for each thread. On each clock cycle, dispatch circuit 140 selects one of the instructions from buffer 138 for execution, obtains the source operands from register file 144, and forwards the instruction and operands to execution module 142 for execution. Dispatch circuit 140 advantageously selects a next instruction to execute based on which instructions in buffer 138 have their source operands available in register file 144 and may select instructions without regard for which thread is the source of the selected instruction. Fetch circuit 136 monitors buffer 138 and, after an instruction for a particular thread has issued from buffer 138, fetches the next instruction for that thread. As a result, for a given clock cycle, instructions from most or all of the active threads may be available in buffer 138, and dispatch circuit 140 may select an instruction from any thread, regardless of which thread was last selected. Specific embodiments of fetch circuit 136, buffer 138 and dispatch circuit 140 are described below.

Execution module 142 may be of generally conventional design and may include any number of individual execution units. Some or all of the execution units may be configured for single-instruction multiple-data (SIMD) operation as is known in the art. Execution module 142 receives an instruction and its source operands from dispatch circuit 140, processes the source operands in accordance with the instruction, and stores result data in register file 144. Register file 144 advantageously includes a separate set of registers for each thread processed by execution unit 118, thereby avoiding the need to swap data in and out of registers when switching from one thread to another. Data written to register file 144 becomes available as source operands for subsequent instructions. The instructions may vary in character and may include any number of source operands and any amount and/or kind of result data.

Each instruction generally has a certain latency associated with it; that is, the execution units of execution module 142 require a certain number of clock cycles (which may be one or more) to process the instruction and write the result data to register file 144. Different instructions may have different latencies. For example, a simple vector add operation may be completed in only one or two clock cycles, while a texture fetch operation may require a large number (e.g., 100 or more) of cycles. Execution units of execution module 142 are advantageously implemented in a pipelined architecture so that an instruction can be dispatched on each clock cycle notwithstanding the latency; such architectures are known in the art. Different ones (or groups) of the execution units may be specially adapted to process particular instructions, as is known in the art, and dispatch circuit 140 may select an appropriate one (or group) of execution units within execution module 142 to process a particular instruction.

The instructions of a thread may have data dependencies on other instructions of that thread; that is, one instruction may use result data of a previous instruction as its source operand. An instruction with a data dependency cannot execute until the result data from the instruction on which it depends is available in register file 144. If an instruction with such a data dependency is next for a particular thread, that thread is blocked. In accordance with an embodiment of the present invention, dispatch circuit 140 detects a blocked thread and selects the next instruction of a different thread (which may be any thread that is not blocked) from buffer 138 to be issued next, rather than waiting for the blocked thread to become unblocked. In this manner, latency within one thread can be hidden by executing another thread, so that the efficiency of GPU 114 is improved.

In addition to execution core 118, GPU 114 may also include other features not shown in FIG. 1, such as circuitry for receiving and responding to commands received via system bus 106; such circuitry may be configured to initiate and/or terminate threads in execution core 118 as appropriate. Various control registers, status registers, data caches and the like may be provided on a global, per-core, or per-thread basis. Such features are known in the art, and a detailed description is omitted as not being crucial to understanding the present invention.

It will be appreciated that the system described herein is illustrative and that variations and modifications are possible. A graphics processor may be implemented using any suitable technologies, e.g., as one or more integrated circuit devices. A graphics processor may be mounted on an expansion card (which may include one or more such processors) or integrated into a system chipset (e.g., into the north bridge chip). The graphics processing subsystem may include any amount of dedicated graphics memory (some implementations may have no dedicated graphics memory) and may use system memory and dedicated graphics memory in any combination.

The number of execution cores in the graphics processor is implementation dependent, and optimal choices generally depend on tradeoffs between performance and cost. Each execution core may support concurrent operation of one or more thread types; where multiple cores are provided, different cores in the same processor may be configured identically or differently. The cores are advantageously implemented as independent sub-processors that do not share execution units, and a given thread is executed in one core.

The number of threads in a given core may also be varied according to the particular implementation and the amount of latency that is to be hidden. In this connection, it should be noted that in some embodiments, instruction ordering can also be used to hide some latency. For instance, as is known in the art, compilers for graphics processor code can be optimized to arrange the instructions of the program such that if there is a first instruction that creates data and a second instruction that consumes the data, one or more other instructions that do not consume the data created by the first instruction are placed between the first and second instructions. This allows processing of a thread to continue while the first instruction is executing. It is also known in the art that, for instructions with long latencies, it is usually not practical to place enough independent instructions between creator and consumer to fully hide the latency. In determining the number of threads per core, consideration may be given to the availability (or lack thereof) of such optimizations; e.g., the number of threads supported by a core may be decided based on the maximum latency of any instruction and the average (or minimum or maximum) number of instructions that a particular compiler can be expected to provide between a maximum-latency instruction and its first dependent instruction.

The instruction cache for an execution core may be shared among the threads or may be physically or logically divided among them. In addition, where the core supports multiple thread types, the instruction cache may include a physical and/or logical division corresponding to each thread type, and each division may be further subdivided (or not) among individual threads of that type as desired.

The register file for an execution core advantageously includes a set of registers for each thread and may have any number of read and/or write ports. In addition, physically and/or logically separate register files may be provided for different threads.

Figure 2:
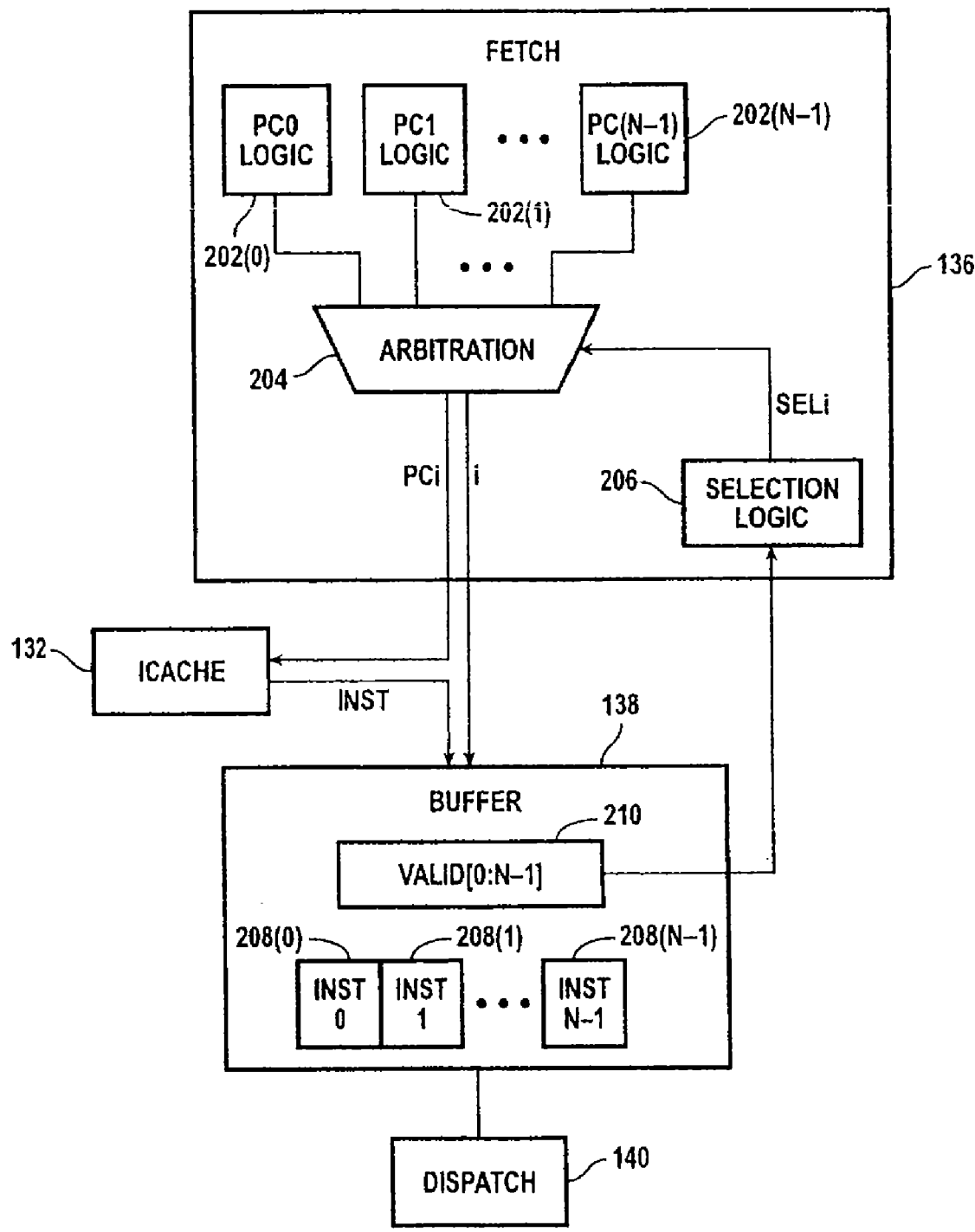
FIG. 2 is a simplified block diagram of an instruction fetch circuit and instruction buffer according to an embodiment of the present invention.

While the configuration of fetch circuit 136, buffer 138, and dispatch circuit 140 may also be varied, specific examples will now be described. FIG. 2 is a simplified block diagram of fetch circuit 140 and buffer 138 for an execution core 118 according to an embodiment of the present invention. In this embodiment, execution core 118 is configured to process up to a maximum number (N) of threads concurrently, although it is to be understood that at any given time some or all of the N threads may be idle or inactive.

Fetch circuit 136 includes a number (N) of program counter logic blocks 202 and an arbitration unit 204 controlled by selection logic circuit 206. (Herein, multiple instances of like objects are denoted with reference numbers identifying the object and parenthetical numbers identifying the instance where needed.)

Each program counter logic block 202 generates a program counter (PC) value for a next sequential instruction in a respective one of the N threads. Program counter logic blocks 202 may be of generally conventional design for updating a program counter and may include incremental counters, branch detection logic, and other features not critical to the present invention.

The PC values generated by PC logic blocks 202 are presented to arbitration unit 204, which selects the PC signal PCi (where $0 \leq i \leq n-1$) from one of the threads (denoted for reference herein as thread i) in response to a selection signal SELi provided by selection block 206 (described below).

The selected signal PCi is transmitted to Icache 132, which returns the corresponding instruction to buffer 138, and the identifier (i) of the corresponding thread is transmitted to buffer 138.

Buffer 138 includes N storage locations 208 (which may be implemented, e.g., using registers), one of which corresponds to each of the N threads, and an array 210 configured to store N valid bits (one for each register). Buffer 138 receives the instruction (INST) from Icache 132 and the thread identifier (i) of the corresponding thread from arbitration unit 204 and directs the instruction INST to the one of locations 208 that corresponds to thread i. When the instruction is stored, the corresponding valid bit in array 210 is set to logical true (e.g., "1").

Buffer 138 is advantageously configured such that dispatch circuit 140 may select an instruction from any one of storage locations 208 to be issued, so that instructions from different threads may be issued in any order. Dispatch circuit 140 is described below; for now it should be noted that when the instruction for a particular thread is issued, the corresponding valid bit in array 210 is advantageously set to logical false (e.g., "0"). As used herein, a "valid thread" is one that has a valid instruction in storage locations 208 and an "invalid thread" is one that does not.

As shown in FIG. 2, selection logic circuit 206 receives the valid bits of array 210 from buffer 138. Selection logic circuit 206 uses validity or invalidity of each thread in selecting the thread i for which an instruction is to be fetched. For example, selection logic circuit 206 may be configured to select only invalid threads; where multiple threads are invalid, selection logic circuit 206 may select the thread that has been invalid longest or may select a thread based on a priority ranking among the threads, where the priority ranking varies from one clock cycle to the next.

Selection logic circuit 206 may also include a rule limiting the frequency with which a particular thread can be selected, e.g., in order to prevent one thread from disproportionately consuming resources. For example, one rule might provide that a given thread is ineligible for reselection until at least M clock cycles have elapsed since it was last selected, where M is some fixed number (which may be established, e.g., as a configurable parameter of the processor). Where such a rule is implemented, there may be clock cycles in which no threads satisfy the selection rules (e.g., the only invalid thread was selected fewer than M cycles ago). In this event, arbitration unit 204 may send no PCi value to Icache 132 for that clock cycle; the next PCi value is sent during a subsequent cycle when a satisfactory thread is found. In one such embodiment, where one thread is selected per clock cycle, M is set to a value that is not larger than the minimum number of threads expected to be active at a given time, thereby reducing the likelihood of a clock cycle in which no thread is selected.

Figure 3:
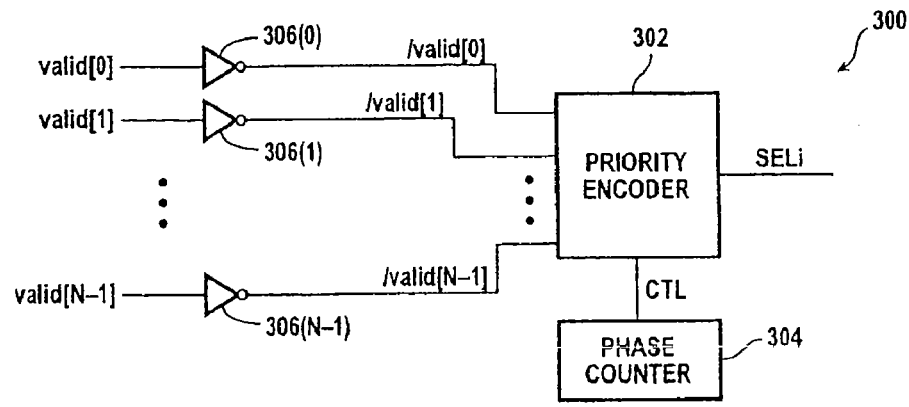
FIG. 3 is a simplified block diagram of a selection logic circuit for selecting an instruction to fetch according to an embodiment of the present invention.

FIG. 3 is a simplified block diagram of a selection logic circuit 300 implementing thread selection rules according to an embodiment of the present invention. Selection logic circuit 300 includes a priority encoder 302 and a phase (or token) counter 304. The valid signal for each thread is inverted by a respective inverter 306, and the resulting /valid signals are provided to priority encoder 302. Priority encoder 302, which may be implemented using conventional digital logic circuitry, selects the highest-priority thread for which the /valid signal is asserted (i.e., the highest-priority invalid thread), where the priority ranking among the threads is determined based on a control signal (CTL) provided by phase counter 304. Phase counter 304 is a modulo N counter that increments on every clock cycle; the control signal CTL corresponds to the current value of phase counter 304. In this embodiment, control signal CTL determines the thread number of the highest-priority thread, and priority encoder 302 ranks the remaining threads in order of ascending (or descending) thread numbers, modulo N.

Because phase counter 304 increments at each clock cycle, the priority ranking of the threads is different for different clock cycles. For example, during a first clock cycle, current thread counter 304 has value 0, and priority encoder 302 gives highest priority to thread 0. In other words, during the first clock cycle, if thread 0 is invalid, priority encoder 302 generates a state of the SELi signal that selects thread 0. If thread 0 is valid, thread 1 is considered next, and so on until an invalid thread is found or a maximum number of threads (which may be less than or equal to N) has been considered. During the next clock cycle, current thread counter 304 has value 1, and priority encoder 302 gives highest priority to thread 1, then to thread 2 if thread 1 is valid, and so on.

Once a thread becomes invalid, it remains invalid until its next instruction is fetched. Thus, while selection logic circuit 300 does not guarantee that, on any given clock cycle, the thread that has been invalid longest is selected, it will be appreciated that any thread that becomes invalid will be selected within N clock cycles of becoming invalid. In some embodiments, the maximum number C of threads that priority encoder 302 considers during a clock cycle may be limited to a number smaller than the total number N of threads. This prevents a thread from being selected on consecutive clock cycles, and the minimum number of clock cycles before a thread can be reselected may be controlled by adjusting the value of C. (In some embodiments, C may be a configurable parameter of the system.)

It will be appreciated that the selection logic circuit and selection rules described herein are illustrative and that variations and modifications are possible. The various circuit components described herein may be implemented using conventional digital logic circuit designs and technologies. Different logic circuits may also be implemented to support different selection rules. For example, in embodiments where more than one instruction may be fetched per clock cycle, the priority encoder may be configured to select multiple threads per clock cycle. Moreover, devices other than priority encoders may be used for determining which invalid thread to select. For instance, the selection logic circuit may maintain a "least recently valid" bit field that is updated when a transition of one of the valid bits between the logical true and logical false states is detected. In still other embodiments, counters or similar circuits may be used to determine elapsed time since a thread became invalid and/or elapsed time since a thread was last selected; comparison logic that operates on the counter values may be provided to identify a least recently valid thread.

Figure 4:
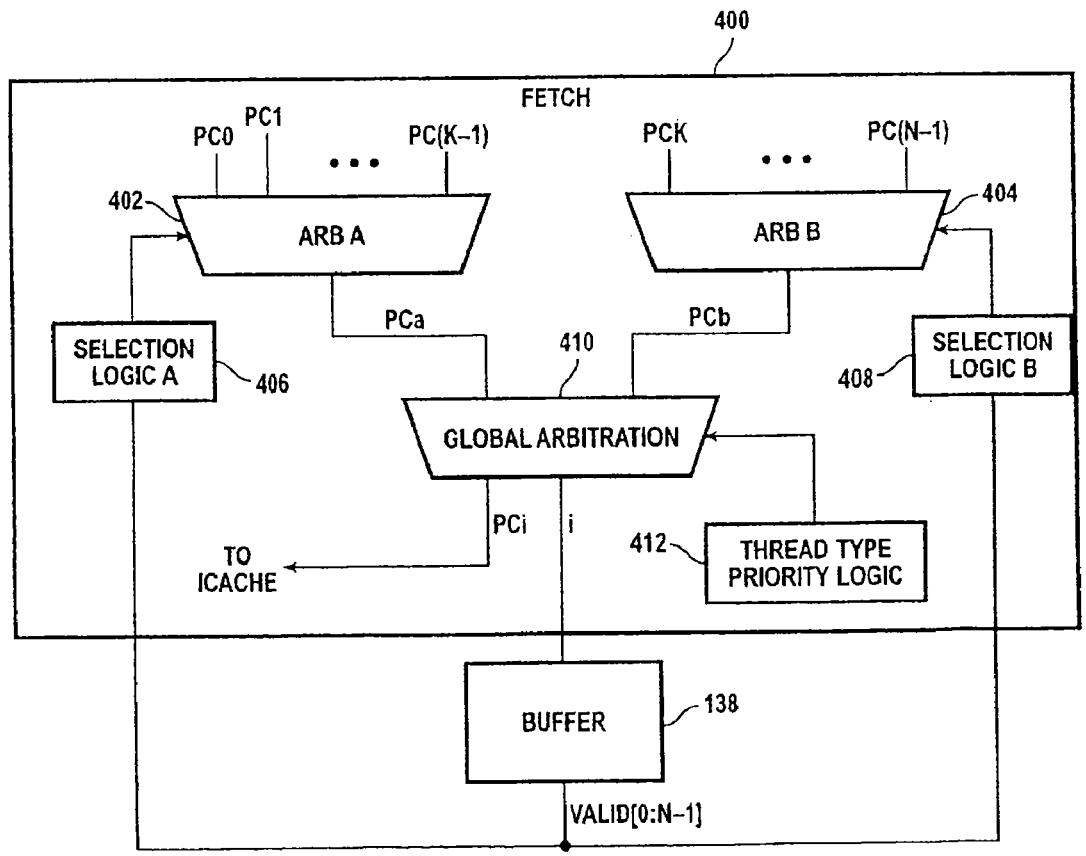
FIG. 4 is a simplified block diagram of an instruction fetch circuit according to an alternative embodiment of the present invention.

In addition, the selection logic may include additional circuitry that inhibits selection of a thread between a selection time and a time when the corresponding instruction appears in buffer 138. For example, in the event of an Icache miss, it may take several cycles to retrieve the instruction from the main instruction store (or a secondary cache) and provide it to buffer 138. In some embodiments, it may be desirable to inhibit reselection of that thread during this interval, e.g., to prevent instructions within a thread from being provided to buffer 138 and/or issued out of their program order. It should be noted that because fetch circuit 136 does not select threads in a round robin fashion, instructions from other threads may continue to be fetched to buffer 138 and issued while fetching of instructions for a thread that encountered an Icache miss is inhibited. Thus, some embodiments described herein can avoid pipeline bubbles and inefficiency in the event of an Icache miss.

Where multiple thread types are supported, the selection logic may take thread type into account or not, as desired. For example, in the embodiment shown in FIG. 2, information about thread types is not provided to selection logic circuit 206. FIG. 4 is a block diagram of a fetch circuit 400 according to an alternative embodiment of the present invention that takes thread type into account. In this embodiment, the execution core also supports N threads, which may include up to K threads of a first type ("A") and up to N-K threads of a second type ("B").

A type A arbitration unit 402 receives program counter signals from the active type A threads (numbered for reference purposes as 0 to K−1), and a type B arbitration unit 404 receives program counter signals from the active type B threads (numbered for reference purposes as K to N−1). Type A arbitration unit 402 selects one of the type A threads in response to a selection signal from selection logic circuit 406, and type B arbitration unit 404 selects one of the type B threads in response to a selection signal from selection logic circuit 408. In one embodiment, the configuration of each of selection logic circuits 406, 408 is generally similar to that described above with reference to FIG. 3 so that each selection logic circuit 406, 408 selects the thread of its respective type that has been invalid the longest; it will be appreciated that other configurations and selection rules may also be used. As described above, depending on the selection rules, there may be clock cycles for which one (or both) of arbitration units 402, 404 does not select any thread.

In response to the selection signals from selection logic circuits 406, 408, type A arbitration unit 402 and type B arbitration unit 404 provide respective selected program counter values (PCa, PCb) to a global arbitration unit 410. Arbitration units 402, 404 also advantageously identify the respective threads (a, b) that were selected. Global arbitration unit 410 selects between PCa and PCb in response to a type selection signal (A/B) generated by a thread-type priority circuit 412.

Thread-type priority circuit 412 may be configured in various ways to define a desired relative priority between thread types A and B. In one embodiment, thread type priority circuit 412 may be configured to give equal priority to both, e.g., by selecting PCa and PCb on alternating clock cycles. In another embodiment, thread type priority circuit 412 may select the least recently valid of the two candidate threads.

In yet another embodiment, thread type priority circuit 412 gives priority to one or the other thread type based on static or dynamic "importance" criteria. Various criteria may be used. For example, if the thread types correspond to pixel threads and vertex threads, it may be desirable to give priority to vertex threads (e.g., because some pixel threads might not be able to be initiated until processing of a relevant vertex thread has been completed). Thus, one selection rule might always choose a vertex thread over a pixel thread. Another selection rule might be defined as a repeating sequence of some number of vertices followed by some number of pixels (e.g., two vertices then one pixel, or three vertices then two pixels, or, more generally, v vertices followed by p pixels for arbitrary integers v and p). Importance can also be defined dynamically, e.g., depending on the number of vertex and/or pixel threads that are currently active or that are currently awaiting processing. Selection rules for thread type priority circuit 412 may be made configurable to support optimization for a particular system implementation.

Global arbitration unit 410 selects between PCa and PCb based on type selection signal A/B and provides the selected program counter value (labeled PCi) to Icache 132 substantially as described above. In some embodiments, the type selection signal A/B may occasionally specify thread type A (or B) during a clock cycle in which no thread of type A (B) was selected by the type-specific arbiter 402 (404). Global arbitration unit 110 may be configured to select PCb (PCa) in this event or to select no thread (i.e., no PCi is sent to Icache 132).

It will be appreciated that the fetch circuit and buffer described herein are illustrative and that variations and modifications are possible. Where different threads (or different thread types) have physically or logically separate instruction caches, the fetch circuit may be configured to direct the selected PC value to the appropriate cache, or to provide a thread (or thread type) identifier that can be used to select the appropriate cache. The buffer may provide storage for more than one instruction per thread, e.g., by providing a FIFO register for each thread, and the fetch circuit may select a next thread to fetch based on the number of invalid or unused entries in each of the FIFOs.

In some embodiments, it is not necessary for the fetch circuit to prefill the buffer to any particular level prior to instruction issue. Instead, the buffer may tend to fill naturally as instruction issue occasionally skips clock cycles due to data dependencies and the like. The thread selection logic of the fetch circuit is advantageously configured to select threads only when space exists in the buffer for an storing instruction from that thread, thereby avoiding buffer overflow.

Figure 5:
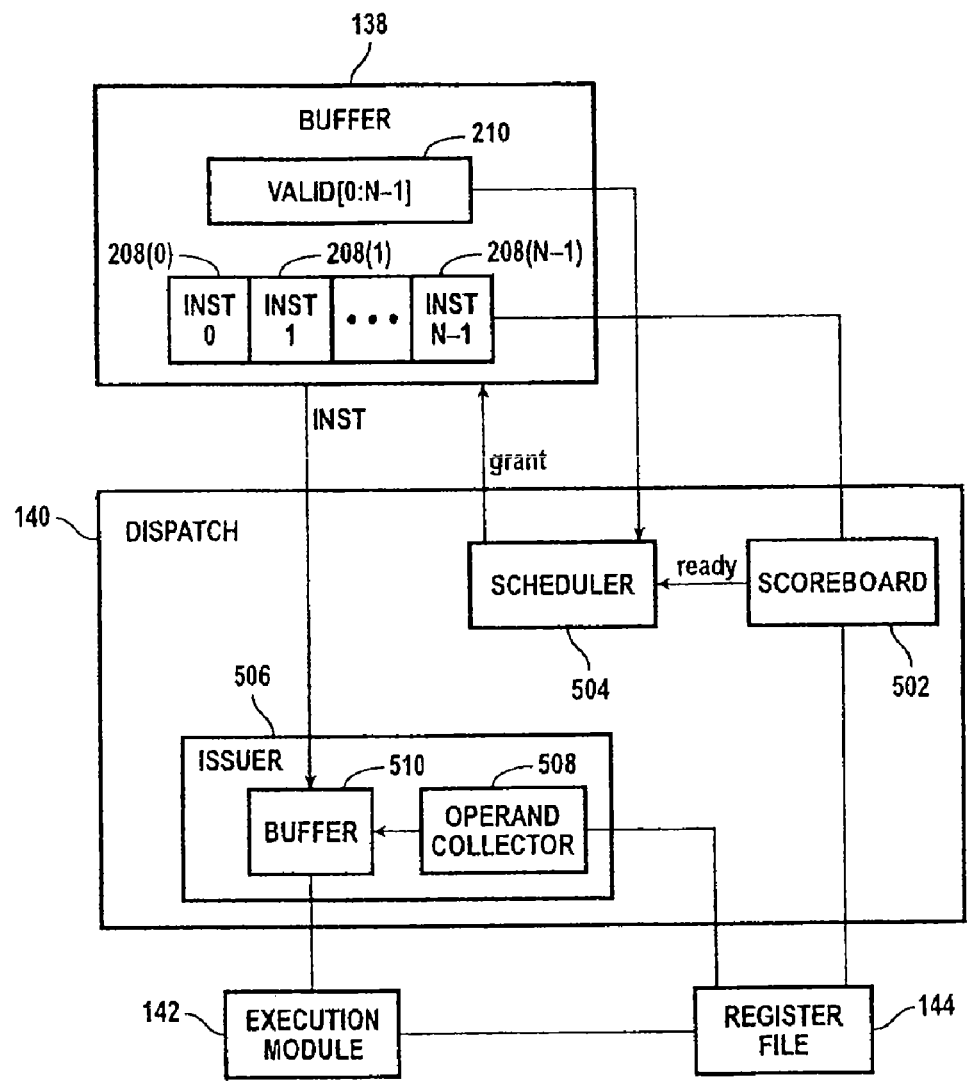
FIG. 5 is a simplified block diagram of an instruction dispatch circuit according to an embodiment of the present invention.

FIG. 5 is a simplified block diagram of a dispatch circuit 140 according to an embodiment of the present invention. Dispatch circuit 140 includes a scoreboard circuit 502, a scheduler 504, and an issue circuit (or issuer) 506. Scoreboard circuit 502, which may be of generally conventional design, reads each of the (valid) instructions in buffer 138. For each instruction, scoreboard circuit 502 checks register file 144 to determine whether the source operands are available. Scoreboard circuit 502 generates a set of ready signals (e.g., one bit per thread) indicating which instructions in buffer 138 are ready to be executed, i.e., have their source operands available in register file 144. Scheduler 504 receives the ready signals from scoreboard 502 and the valid signals from buffer 138 and selects a next instruction to dispatch. The selected instruction is dispatched to issuer 506, which issues the instruction by forwarding it to execution module 142. The thread identifier of the thread to which the selected instruction belongs may also be forwarded to issuer 506 and/or execution module 142, e.g., to enable selection of the appropriate registers for the source operands and result data.

Scheduler 504 is advantageously configured to select among the ready instructions in buffer 138 with few or no constraints based on an order among threads. For example, scheduler 504 may select the ready instruction in buffer 138 that has been waiting (valid) longest, regardless of when that thread was last selected.

Figure 6:
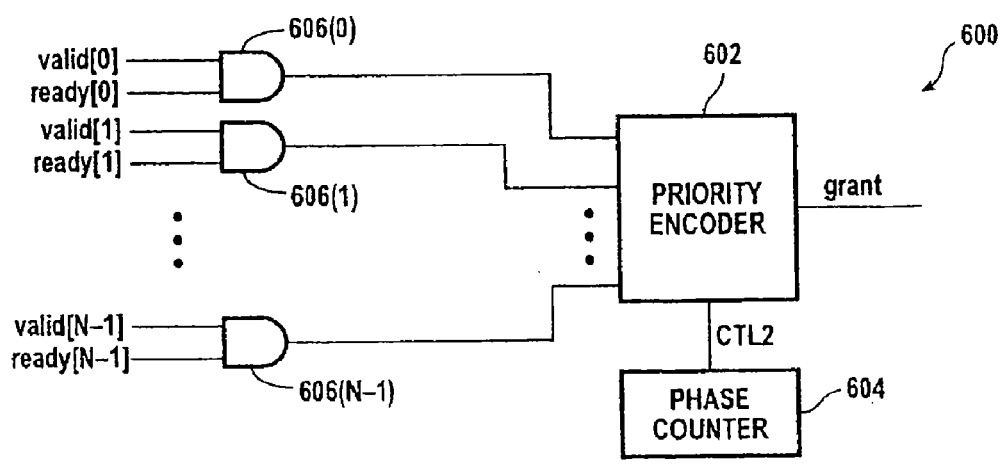
FIG. 6 is a simplified block diagram of selection logic for selecting an instruction to issue according to an embodiment of the present invention.

FIG. 6 is a simplified block diagram of a selection logic circuit 600 that may be included in scheduler 504 for selecting a thread to be dispatched from buffer 138. Selection logic circuit 600 includes a priority encoder 602 and a phase (or token) counter 604. The valid signal and the ready signal for each thread are provided as inputs to a respective AND circuit 606. Priority encoder 602 receives the output signals from AND circuits 606, i.e., a signal for each thread that is asserted when the thread's instruction in buffer 138 is valid and ready to be executed. (In some embodiments, the ready signal for a thread is not asserted when the thread is invalid, so that AND circuits 606 may be omitted.) Priority encoder 602, which may be implemented using conventional digital logic circuitry, selects the highest-priority thread for which the ready and valid signals are both asserted (i.e., the highest priority ready thread), where the priority ranking among the threads is determined based on a control signal (CTL2) provided by phase counter 604. phase counter 604 is a modulo N counter that increments on every clock cycle; the control signal CTL2 corresponds to the current value of counter 604. In this embodiment, control signal CTL2 determines the thread number of the highest-priority thread, and priority encoder 602 ranks the remaining threads in order of ascending (or descending) thread numbers, modulo N. Phase counter 604 may have the same phase as current thread counter 304 of FIG. 3 (both counters may be implemented as the same counter if desired), or it may have a different phase.

Operation of priority encoder 602 is similar to that described above for priority encoder 302 of FIG. 3, and because phase counter 604 increments at each clock cycle, the priority ranking of the threads is different for different clock cycles. For example, during a first clock cycle, current thread counter 604 has value 0, and priority encoder 602 gives highest priority to thread 0 (i.e., selects thread 0 if thread 0 is ready), then to thread 1 if thread 0 is not ready, and so on until a ready thread is found or a maximum number of threads is considered. During the next clock cycle, current thread counter 604 has value 1, and priority encoder 602 gives highest priority to thread 1, then to thread 2 if thread 1 is not ready, and so on.

Once a thread becomes ready, it remains ready until its instruction is dispatched. Thus, while selection logic circuit 600 does not guarantee that, on any given clock cycle, the thread that has been ready longest is selected, it will be appreciated that any thread that becomes ready (and valid) will be selected within N clock cycles of becoming ready. In some embodiments, it may be desirable to prevent the same thread from being selected during consecutive clock cycles; accordingly, the maximum number of threads that priority encoder 602 considers during a clock cycle may be limited to a number smaller than the total number N of threads. (This maximum number may also be a configurable parameter of the system.)

It will be appreciated that the selection logic circuit and selection rules described herein are illustrative and that variations and modifications are possible. The various circuit components described herein may be implemented using conventional digital circuit designs and technologies. Different logic circuits may also be implemented to support different selection rules. For example, in superscalar embodiments (where more than one instruction may be issued per clock cycle), the selection logic may be configured to select multiple instructions per clock cycle. Moreover, devices other than priority encoders may be used for determining which ready thread to select. For instance, the selection logic circuit may maintain a "least recently invalid" bit field that is updated when a transition of one of the valid bits between the logical true and logical false states is detected; this bit field may be used to select the ready instruction that has been valid the longest. In still other embodiments, counters may be used to determine elapsed time since a thread became valid (or ready) and/or elapsed time since a thread was last selected; comparison logic that operates on the counter values may be provided to identify the ready thread that has been valid the longest.

In still other embodiments, other kinds of selection rules may be implemented. For instance, selection may be based in part on thread type (e.g., using selection logic similar to that shown in FIG. 4 above). Selection may also be based in part on the type of operation to be performed (e.g., giving different priorities to a MULTIPLY operation, a CALL operation, an ADD operation and so on). In addition, selection may take into account the state of the execution module. In one such embodiment, execution module 142 contains specialized execution units (or execution pipes), with different operations being directed to different execution units; e.g., there may be an execution unit that performs floating-point arithmetic and another that performs integer arithmetic. If the execution unit needed by a ready instruction for one thread is busy, an instruction from a different thread may be selected. For instance, suppose that at a given time, the floating-point pipeline is busy and the integer pipeline is free. A thread with an integer-arithmetic instruction ready can be given priority over a thread with a floating-point instruction.

Referring again to FIG. 5, in response to the grant signal from scheduler 504, the requested instruction in buffer 138 is dispatched to issuer 506. In one embodiment, issuer 506 includes an operand collector 508 and a buffer 510. Buffer 510 receives the dispatched instruction, and operand collector 508 collects source operands for the instructions in buffer 510 from register file 144. Depending on the configuration of register file 144, collection of source operands may require multiple clock cycles, and operand collector 508 may implement various techniques for optimizing register file accesses for efficient operand collection given a particular register file configuration; examples of such techniques are known in the art.

Buffer 510 is advantageously configured to store collected operands together with their instructions while other operands for the instruction are being collected. In some embodiments, issuer 506 is configured to issue instructions to execution units 142 as soon as their operands have been collected. Issuer 506 is not required to issue instructions in the order in which they were dispatched. For example, instructions in buffer 510 may be stored in a sequence corresponding to the order in which they were dispatched, and at each clock cycle issuer 506 may select the oldest instruction that has its operands by stepping through the sequence (starting with the least-recently dispatched instruction) until an instruction that has all of its operands is found. This instruction is issued, and instructions behind it in the sequence are shifted forward; newly dispatched instructions are added at the end of the sequence. The sequence may be maintained, e.g., by an ordered set of physical storage locations in buffer 510, with instructions being shifted to different locations as preceding instructions are removed.

In one embodiment, an instruction that has been dispatched to issuer 506 remains in buffer 138 until it has been issued to execution module 142. After dispatch, the instruction is advantageously maintained in a valid but not ready state (e.g., the valid bit 210 for a dispatched instruction may remain in the logical true state until the instruction is issued). It will be appreciated that in embodiments where issuer 506 may issue instructions out of the dispatch order, this configuration can help to prevent multiple instructions from the same thread from being concurrently present in buffer 510, thereby preserving order of instructions within a thread.

In other embodiments, issuer 506 does not perform operand collection. For example, issuer 506 may issue instructions to execution module 142 (or specific execution units thereof) as they are received and signal register file 144 to provide the appropriate source operands to execution module 142 (or specific execution units thereof). In this embodiment, operand collector 508 and buffer 510 may be omitted. It will be appreciated that the particular configuration of issuer 506 is not critical to understanding the present invention.

It will be appreciated that the dispatch circuit described herein is illustrative and that variations and modifications are possible. The various logic circuits described herein for the scheduler circuit may be implemented using conventional digital circuit designs and technologies. Different logic circuits may also be implemented to support different selection rules. The scheduler may also include various kinds of logic circuitry implementing additional selection rules, e.g., a minimum number of cycles before a thread can be reselected for issue, and/or different selection rules, e.g., giving priority to one thread type over another. Such rules may be implemented using logic circuitry and techniques similar to those described above in the context of thread selection for the fetch circuit.

While the invention has been described with respect to specific embodiments, one skilled in the art will recognize that numerous modifications are possible. For instance, while the embodiments described herein are configured for scalar (i.e., one per clock cycle) instruction issue, alternative embodiments may support superscalar (i.e., more than one per clock cycle) instruction issue. In a superscalar embodiment, the instructions issued in a given clock cycle may be drawn from the various threads in any combination desired (e.g., some embodiments may limit issue to one instruction per thread per clock cycle, while others may allow multiple instructions from the same thread to be issued in the same clock cycle). In superscalar (or scalar) embodiments, the fetch circuit may also be modified to fetch more than one instruction per clock cycle. Thus, it is to be understood that the present invention includes embodiments that fetch an arbitrary number (F) of instructions and issue an arbitrary number of instructions (P) each cycle, where the numbers F and P may be allocated among multiple threads in any manner desired. Embodiments of the invention may also be adapted for use in asynchronous processors.

In addition, out-of-order instruction issue within a thread may be implemented if desired, e.g., by adapting out-of-order issue techniques from general-purpose processors that allow issue of any ready instruction within an "active window."

The execution cores described herein are not limited to any particular number or configuration of execution units. For example, multiple execution units may collaborate to process a given instruction, different execution units may receive different instructions (or the same instruction with different data) in parallel, and so on. The execution units may process instructions with fixed or variable latency and may be pipelined to accept new instructions every clock cycle or, more generally, at intervals consisting of some fixed number of clock cycles.

As noted above, any number of threads and any number of thread types may be supported, with each thread type corresponding to a programmed sequence of instructions to be executed. Program instructions may be provided in various ways, including built-in instructions stored in non-volatile memory of the graphics processor or other graphics processing subsystem components, instructions supplied by a graphics driver program at system initialization and/or runtime, and/or application-supplied program code (e.g., in the case of a programmable shader). Programs may be created in suitable high-level languages (e.g., C, Cg, or the like) and compiled using an appropriate compiler for the programming language and the graphics processor on which the program is to be executed. Translation of input instructions to a different format (or a different instruction set) that is compatible with the execution units may be provided within the execution core, within other components of the graphics processor, or elsewhere in the computer system.

Graphics processors as described herein may be implemented as co-processors in a wide array of computing devices, including general purpose desktop, laptop, and/or tablet computers; various handheld devices such as personal digital assistants (PDAs), mobile phones, etc.; special-purpose computer systems such as video game consoles; and the like.

It will also be appreciated that, although the invention has been described with reference to graphics processors, the systems and methods described herein may also be implemented in other multithreaded microprocessors.

Thus, although the invention has been described with respect to specific embodiments, it will be appreciated that the invention is intended to cover all modifications and equivalents within the scope of the following claims.

What is claimed is:

1. A method for processing instructions in a microprocessor configured for parallel processing of a plurality of threads, wherein each thread includes a sequence of instructions, the method comprising:

fetching a first instruction from a first thread of the plurality of threads into an instruction buffer configured to store an instruction from each of the plurality of threads, wherein the act of fetching the first instruction includes the acts of:

receiving a candidate program counter value from each of the plurality of threads;

assigning a priority ranking to each of the plurality of threads, wherein the priority ranking is different at different times; and selecting the first thread among the plurality of threads based at least in part because the first thread is the highest priority thread for which an instruction is not stored in the instruction buffer, wherein the first instruction is fetched in response to selecting the first thread;

subsequently fetching a second instruction from a second one of the plurality of threads into the instruction buffer;

determining that the first instruction and the second instruction are each ready to execute; and issuing a ready one of the first instruction and the second instruction for execution in response to the selection of the first thread, wherein the second instruction is issued prior to issuing the first instruction in the event that the second instruction is ready to execute and the first instruction is not ready to execute.

2. The microprocessor of claim 1, further comprising an instruction cache configured to store instructions, wherein the fetch circuit is further configured to fetch the next instruction by transmitting a request including a program counter value to the instruction cache.

3. The microprocessor of claim 2, wherein the fetch circuit includes:

a selection logic circuit configured to select one of the plurality of threads based at least in part on determining which of the storage locations in the instruction buffer is available, the selection logic circuit being further configured to provide a corresponding selection signal; and an arbitration circuit configured to receive the selection signal and to transmit the candidate program counter value corresponding to the selected thread to the instruction cache.

4. The microprocessor of claim 3, wherein the selection logic circuit includes:

a priority encoder configured to select one of the plurality of threads that does not have an instruction in the instruction buffer in accordance with the priority ranking among the threads, the priority ranking being determined based on a priority control signal; and a phase counter configured to generate the priority control signal, wherein at different times, the priority control signal gives the different priority rankings to different ones of the threads.

5. The microprocessor of claim 3, wherein the selection logic circuit is further configured to select a first thread only after a minimum time has elapsed since a previous occurrence of selecting the first thread.

6. The microprocessor of claim 3, wherein the plurality of threads includes a first group of threads having a first thread type and a second group of threads having a second thread type, and wherein the selection logic circuit is further configured to select one of the plurality of threads based at least in part on respective thread types of each of the plurality of threads.

7. The microprocessor of claim 6, wherein the selection logic circuit is further configured to select a first candidate thread having the first thread type and a second candidate thread having the second thread type, and to select between the first candidate thread and the second candidate thread based on the respective thread types.

8. The microprocessor of claim 1, further comprising a register file configured to store data for each of the plurality of threads, including result data generated by the execution module.

9. The microprocessor of claim 8, wherein the dispatch circuit includes:

a scoreboard circuit coupled to the instruction buffer and the register file and configured to generate a ready signal for each instruction in the instruction buffer, wherein the ready signal for each instruction is asserted or not asserted based at least in part on whether a source operand for the instruction is present in the register file;

a scheduler circuit coupled to the scoreboard and to the instruction buffer, the scheduler circuit being configured to select one of the instructions in the instruction buffer for which the ready signal is asserted as a next instruction to issue and to transmit a corresponding grant signal to the instruction buffer; and an issuer circuit coupled to the instruction buffer, wherein the instruction buffer is further configured to transmit the instruction selected by the scheduler circuit to the issuer circuit in response to the grant signal, the issuer circuit being configured to collect the source operand for the selected instruction from the register file and to forward the selected instruction and the source operand to the execution module.

10. The microprocessor of claim 9, wherein the scheduler circuit is further configured to select the next instruction to issue based at least in part on a length of time that each instruction has been stored in the instruction buffer.

11. The microprocessor of claim 9, wherein the scheduler circuit includes:

a priority encoder configured to select one of the plurality of threads that has an instruction in the instruction buffer for which the ready signal is asserted, wherein the one of the threads is selected in accordance with the priority ranking among the threads, the priority ranking being determined based on a priority control signal; and a phase counter configured to generate the priority control signal, wherein at different times, the priority control signal gives different priority rankings to different ones of the threads.

12. The microprocessor of claim 9, wherein the plurality of threads includes a first group of threads having a first thread type and a second group of threads having a second thread type, and wherein the scheduler circuit is further configured to select one of the plurality of threads based at least in part on respective thread types of each of the plurality of threads.

13. The microprocessor of claim 9, wherein the scheduler circuit is further configured to select one of the plurality of threads based at least in part on a relative priority among operations associated with the respective instructions of each of the threads.

14. The microprocessor of claim 9, wherein the execution module includes a plurality of execution pipes, and the scheduler circuit is further configured to select one of the plurality of threads based at least in part on a determination of which of the plurality of execution pipes is not busy.

15. A method for processing instructions in a microprocessor configured for parallel processing of a plurality of threads, wherein each thread includes a sequence of instructions, the method comprising:

receiving a candidate program counter value for each of the plurality of threads;

assigning a priority ranking to at least a subset of the plurality of threads, wherein the priority ranking is different at different times;

selecting a first one of the plurality of threads based at least in part because the first thread is the highest priority thread for which an instruction is not stored in the instruction buffer;

fetching, in response to the selection of the first thread, a first instruction from the first thread into an instruction buffer configured to store an instruction from each of the plurality of threads;

subsequently fetching a second instruction from a second one of the plurality of threads into the instruction buffer;

determining that the first instruction and the second instruction are each ready to execute; and issuing a ready one of the first instruction and the second instruction for execution in response to the selection of the first thread, wherein the second instruction is issued prior to issuing the first instruction in the event that the second instruction is ready to execute and the first instruction is not ready to execute.

16. The method of claim 15, further comprising the acts of:

subsequently to the act of issuing, determining whether the issued instruction was fetched for the first thread or the second thread; and fetching a third instruction into the instruction buffer, wherein the third instruction is a next instruction in the thread corresponding to the issued instruction.

17. The method of claim 15, further comprising the act of inhibiting the act of selecting the first thread in the event that a time elapsed since a previous occurrence of selecting the first thread is less than a minimum time.

18. The method of claim 15, wherein the plurality of threads includes a first group of threads having a first thread type and a second group of threads having a second thread type, wherein the first thread is one of the first group of threads and wherein the act of fetching the first instruction includes the acts of:
receiving a candidate program counter value from each of the plurality of threads;
assigning a priority ranking to each of the first group of threads, wherein the priority ranking is different at different times;
selecting the first thread from among the first group of threads in the event that the first thread is the highest priority thread of the first group for which an instruction is not stored in the instruction buffer;
selecting a third thread from among the second group of threads; and
choosing one of the first thread and the third thread based at least in part on the respective thread types of the first thread and the third thread,
wherein the first instruction is fetched in the event that the act of choosing results in choosing the first thread.

19. The method of claim 15, wherein the act of determining includes the acts of:
determining whether a source operand of the first instruction is available; and
determining whether a source operand of the second instruction is available.

20. The method of claim 15, wherein the priority ranking is based on thread type.

21. The method of claim 15, wherein the first thread has a first thread type and the second thread has a second thread type, and wherein in the event that both of the first instruction and the second instruction are ready to be executed, the act of selecting a ready one of the first instruction includes selecting between the first instruction and the second instruction based at least in part on their respective thread types.

22. A graphics processing system comprising:
a graphics processor including a plurality of execution cores; and
a graphics memory coupled to the graphics processor,
wherein each of the plurality of execution cores includes:
an execution module configured to execute instructions for all of the plurality of threads;
an instruction buffer including a plurality of storage locations, each storage location being associated with a respective one of the plurality of threads;
a fetch circuit configured to:
generate a candidate program counter value for each of the plurality of threads;
assign a priority ranking to at least a subset of the plurality of threads, wherein the priority ranking is different at different times;
select a first one of the plurality of threads based at least in part because the first thread is the highest priority thread for which an instruction is not stored in the instruction buffer;
fetch, in response to the selection of the first thread, a first instruction from the first thread into the instruction buffer; and
subsequently fetch a second instruction from a second one of the plurality of threads into the instruction buffer; and
a dispatch circuit configured to determine which of the stored instructions in the instruction buffer is ready to execute and to select one of the ready instructions to be issued to the execution module, wherein the dispatch circuit is configured to issue the second instruction prior to issuing the first instruction in the event that the second instruction is ready to execute and the first instruction is not ready to execute.

23. A microprocessor configured for parallel processing of a plurality of threads, wherein each thread includes a sequence of instructions, the microprocessor comprising:
an execution module configured to execute instructions for all of the plurality of threads;
an instruction buffer including a plurality of storage locations, each storage location being associated with a respective one of the plurality of threads;
a fetch circuit configured to:
generate a candidate program counter value for each of the plurality of threads;
assign a priority ranking to at least a subset of the plurality of threads, wherein the priority ranking is based at least in part on thread type and is different at different times;
select a first one of the plurality of threads based at least in part because the first thread is the highest priority thread for which an instruction is not stored in the instruction buffer;
fetch, in response to the selection of the first thread, a first instruction from the first thread into the instruction buffer; and
subsequently fetch a second instruction from a second one of the plurality of threads into the instruction buffer; and
a dispatch circuit configured to determine which of the stored instructions in the instruction buffer is ready to execute and to select one of the ready instructions to be issued to the execution module, wherein the dispatch circuit is configured to issue the second instruction prior to issuing the first instruction in the event that the second instruction is ready to execute and the first instruction is not ready to execute.

* * * * *